United States Patent
Munson

(10) Patent No.: US 9,115,747 B1
(45) Date of Patent: Aug. 25, 2015

(54) ARTICULATING GREASE SHIELD FOR USE IN A CONSTANT VELOCITY JOINT

(71) Applicant: Oris Williams Munson, Boulder City, NV (US)

(72) Inventor: Oris Williams Munson, Boulder City, NV (US)

(73) Assignee: CVJAGS, LLC, Boulder City, NV (US)

( * ) Notice: Subject to any disclaimer, the term of this patent is extended or adjusted under 35 U.S.C. 154(b) by 0 days.

(21) Appl. No.: 13/747,249

(22) Filed: Jan. 22, 2013

(51) Int. Cl.
  *F16C 1/24* (2006.01)
  *F16D 3/223* (2011.01)

(52) U.S. Cl.
  CPC ........................................ *F16C 1/24* (2013.01)

(58) Field of Classification Search
  USPC .................. 464/7, 15, 170, 173, 904–906
  See application file for complete search history.

(56) References Cited

U.S. PATENT DOCUMENTS

| | | | | |
|---|---|---|---|---|
| 1,258,278 | A | * | 3/1918 | Urschel .......................... 464/170 |
| 2,008,830 | A | * | 7/1935 | Johnson ..................... 464/173 X |
| 5,586,939 | A | * | 12/1996 | Swinney .................... 464/904 X |
| 5,954,587 | A | | 9/1999 | Jacob et al. |
| 6,368,224 | B1 | | 4/2002 | Knodle et al. |
| 6,579,187 | B2 | * | 6/2003 | Ramey .......................... 464/15 X |
| 6,663,494 | B2 | | 12/2003 | Curi |
| 6,695,706 | B2 | | 2/2004 | Furuta |
| 6,913,540 | B2 | | 7/2005 | Iihara et al. |
| 7,097,568 | B2 | | 8/2006 | Kuczera et al. |
| 7,377,854 | B2 | * | 5/2008 | Wormsbaecher ......... 464/906 X |
| 7,534,172 | B2 | | 5/2009 | Wormsbaecher |
| 7,708,645 | B2 | | 5/2010 | Miller et al. |
| 7,905,785 | B2 | | 3/2011 | Madden et al. |
| 7,922,590 | B2 | | 4/2011 | Pallante |
| 8,118,682 | B2 | * | 2/2012 | Kohana et al. ................... 464/15 |
| 8,162,767 | B2 | * | 4/2012 | Holzhei .................... 464/906 X |
| 8,167,726 | B2 | | 5/2012 | Wormsbaecher et al. |
| 2011/0059803 | A1 | | 3/2011 | Kozlowski et al. |
| 2011/0065518 | A1 | | 3/2011 | Patterson et al. |
| 2012/0129616 | A1 | | 5/2012 | Disser |

FOREIGN PATENT DOCUMENTS

WO     WO 8103210 A1 * 11/1981
WO     WO 2012069628 A1 * 5/2012

* cited by examiner

*Primary Examiner* — Gregory Binda
*Assistant Examiner* — Josh Skroupa
(74) *Attorney, Agent, or Firm* — Jeffrey D. Moy; Weiss & Moy, P.C.

(57) ABSTRACT

An articulating grease shield has a plurality of ring members, wherein each ring member has a central opening through which an axle is positioned through, the central opening allowing for each of the ring members to move freely with articulation of the axle and to form a barrier to keep a lubricant within a constant velocity joint.

14 Claims, 3 Drawing Sheets

ARTICULATING GREASE SHIELD FOR USE IN A CONSTANT VELOCITY JOINT

RELATED APPLICATIONS

The present patent application is related to U.S. Provisional Application Ser. No. 61/589,397, filed Jan. 23, 2012, in the name of the same inventor listed above, and entitled, "ARTICULATING GREASE SHIELD FOR USE WITH CONSTANT VELOCITY JOINT". The present patent application is further related to U.S. Provisional Application Ser. No. 61/703,263, filed Sep. 20, 2012, in the name of the same inventor listed above, and entitled, "ARTICULATING GREASE SHIELD FOR USE WITH CONSTANT VELOCITY JOINT". The present patent application claims the benefit under 35 U.S.C. §119(e).

BACKGROUND

Embodiments of this disclosure relate generally to a grease shield, and more particularly, to a shield that allows grease to be retained in a constant velocity joint with high articulation angles wherein the shield consists of a series of rings that overlap one another in an outer case that allows the rings to rotate with an axle and articulate at high angles.

A universal joint is a mechanical coupling device that provides a rotational driving connection between two rotatable shafts, while permitting such shafts to be oriented at an angle relative to one another. Universal joints are commonly used in the drive train systems of vehicles. For example, universal joints are often used to rotatably connect a driveshaft tube between an output shaft of an engine/transmission assembly or other source of rotational power and an input shaft of an axle assembly including a pair of driven wheels.

The current art for a constant velocity joint grease shield does not provide a barrier that retains the grease in the constant velocity joint on vehicles that require high articulation angles of the axle. This results in the grease spinning out of the constant velocity joint and into the boot upon acceleration. This causes the joint to dry out, which leads to premature wear of the constant velocity joint.

One solution to the above issue as disclosed in U.S. Pat. No. 6,579,187, issued to John A. Ramey. Ramey discloses a barrier for use in a constant velocity joint wherein the constant velocity joint has a lubricant within an outer race and a boot secured to a boot cover. The barrier includes a shield wherein that shield is in contact with the outer race and the boot cover. The shield generally has a body with a cup shaped cross section and a circumferential flange extending therefrom. The shield provides a barrier between the boot and the heat and grease lubricant of the constant velocity joint. However, the Ramey design only works in vehicles that do not require high articulation angles.

Further, in the past these shields have been made out of rubber. This allowed the axle to move but only as far as the tolerances of the rubber seal. In the existing art excessive deflection would cause the seal to tear. The other problem associated with the existing art is that the rubber would crack over time with the exposure to the elements, grease and constant deflection and heat.

Therefore, it would be desirable to provide a device and method that overcomes the above problems.

SUMMARY

This summary is provided to introduce a selection of concepts in a simplified form that are further described below in the DESCRIPTION OF THE APPLICATION. This summary is not intended to identify key features of the claimed subject matter, nor is it intended to be used as an aid in determining the scope of the claimed subject matter.

An articulating grease shield has a plurality of ring members, wherein each ring member has a central opening through which an axle is positioned through, the central opening allowing for each of the ring members to move freely with articulation of the axle and to form a barrier to keep a lubricant within a constant velocity joint.

An articulating grease shield has a base plate. A cover is positioned over the base plate. A spacer is positioned between the base plate and cover. A plurality of ring members is provided, wherein each ring member has a central opening through which an axle is positioned through, the central opening allowing for each of the ring members to move freely with articulation of the axle and to form a barrier to keep a lubricant within a constant velocity joint. The spacer has a thickness corresponding to a combined thickness of the plurality of ring members and clearance tolerances that allow for rotation of the plurality of ring members within the spacer.

An articulating grease shield has a base plate. A cover is positioned over the base plate. A plurality of ring members is positioned between the base plate and cover, wherein each ring member has a central opening through which an axle is positioned through, the central opening allowing for each of the ring members to move freely with articulation of the axle and to form a barrier to keep a lubricant within a constant velocity joint.

The features, functions, and advantages may be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DESCRIPTION OF THE APPLICATION

Figure 1:
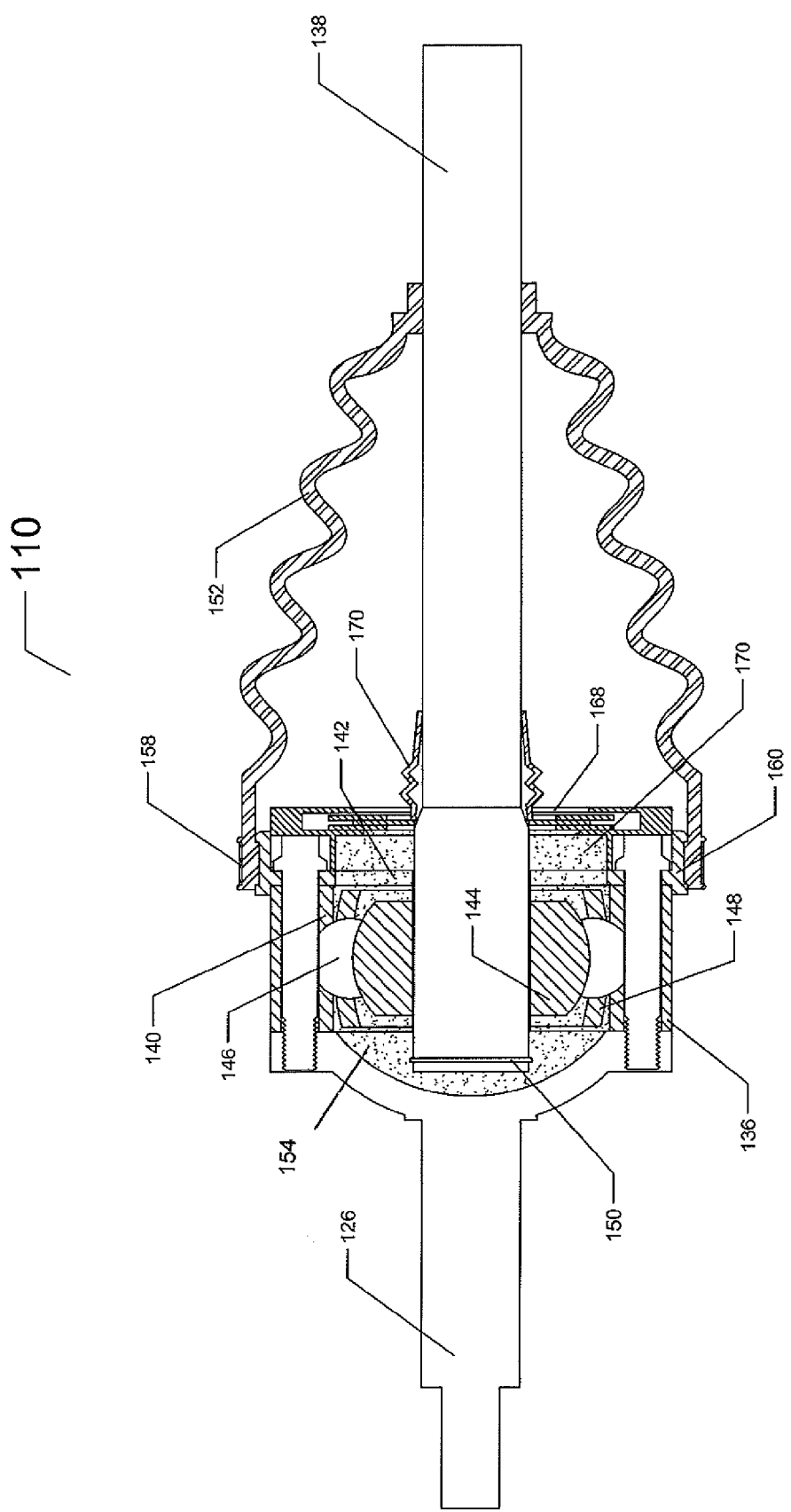
FIG. 1 is a cross-sectional view of a constant velocity joint with an articulating grease shield of the present invention.

Referring to FIG. 1, a simplified cross sectional view of a constant velocity joint 110 having an articulating grease shield 168 is shown. The constant velocity joint 110 may be used to allow rotational driving connection between two rotatable shafts 126 and 138. The constant velocity joint 110 may include an outer race 136 which may be integral to one end of the rotatable shaft 126. An inner wall 140 of the outer race 136 defines a constant velocity joint chamber 142. An inner race 144 may be housed with the outer race 136. The inner race 144 may be connected to the axel 138. One or more balls or rolling elements 146 may be located between an outer surface of the inner race 144 and the inner wall 140 of the outer race 136. The ball or rolling element 146 may be held in position by a cage 148. In accordance with one embodiment, the rotatable shafts 126 and 138 may be an axel 138A coupled to a stub axel 126A. A boot cover 152 may be positioned over the constant velocity joint 110. The boot cover 152 may be made out of a rubber material such as urethane or the like. The listing is given as an example and should not be seen in a limiting manner. In accordance with one embodiment, the boot cover 152 maybe coupled to a boot flange 160 formed on the outer race 136 of the constant velocity joint 110. A boot clamp 158 may be used to secure the boot cover 152 to a boot flange 160. The above is given as one example and should not be seen in a limiting manner.

Figure 2:
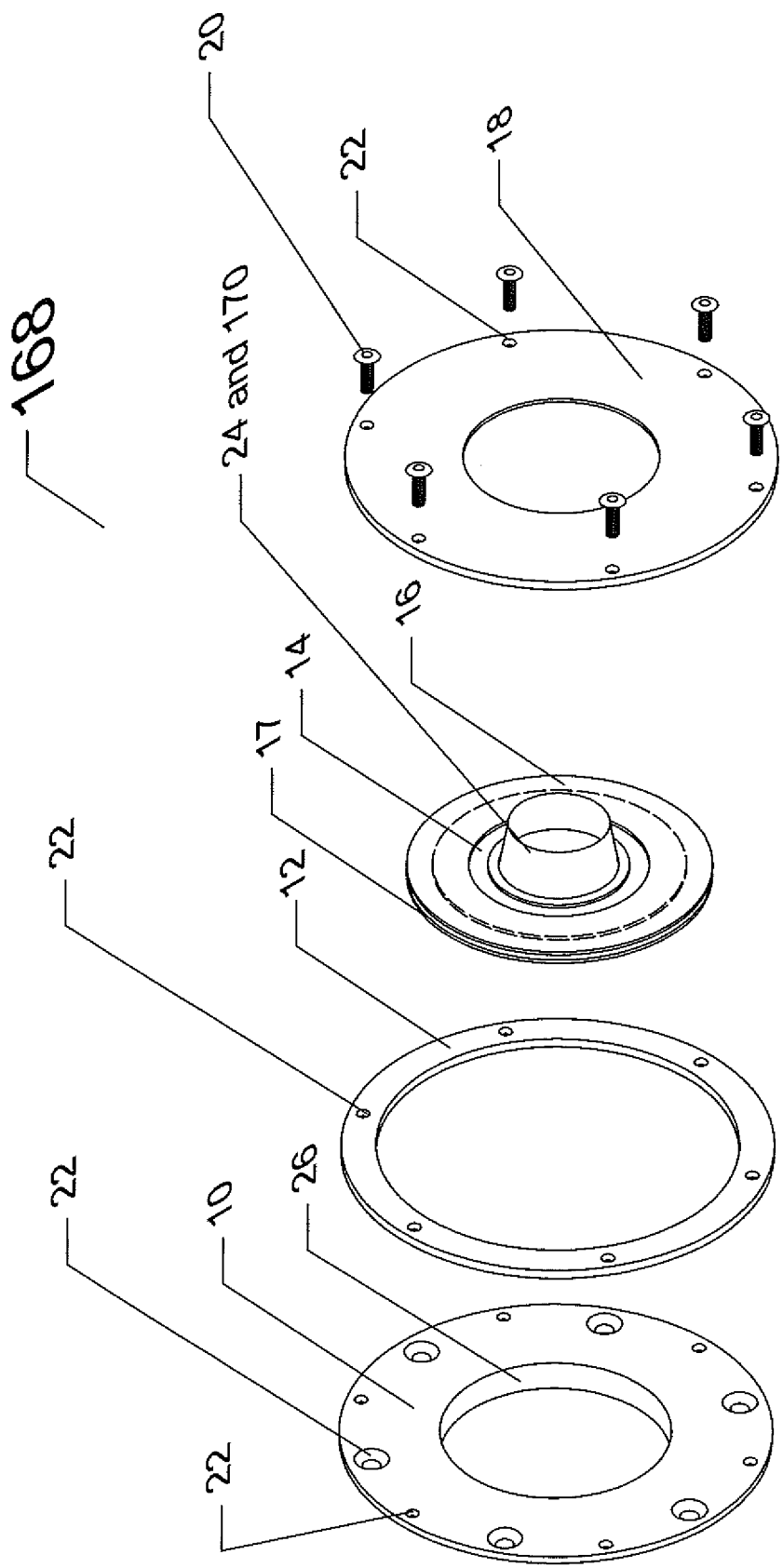
FIG. 2 is an exploded view of the articulating grease shield.

Referring now to FIGS. 1 and 2, the articulating grease shield 168 may reside on an outer race 136 or in a boot flange 160 of the constant velocity joint 110 creating a barrier in a constant velocity joint 110, wherein the constant velocity joint 110 has a lubricant 154 within constant velocity joint chamber 142 and boot 152. The articulating grease shield 168 creates a barrier wherein the articulating grease shield 168 is in contact with the outer race 136 and boot cover 152.

The articulating grease shield 168 generally has a body that consist of several internal rings of different sizes that reside in a case that has a circumferential flange which allow these rings to move freely with the articulation of the axle. The articulating grease shield 168 provides a barrier between the constant velocity joint 110 and the heat and grease lubricant 154 from the boot cover 152. The articulating grease shield 168 also retains the grease in the constant velocity joint 110 for lubrication. It also allows for a safety barrier if the boot cover 152 were to fail.

In accordance with one embodiment, the articulating grease shield 168 may have a base plate 10. The base plate 10 may consists of a flat ring with a grease flange 26 formed around an inner diameter of the base plate 10. The inner diameter may be dimensioned to allow the axle 138 to fit therethrough and to allow the axle 138 full articulation within the inner diameter. The inner diameter of the base plate 10 needs to be less than an outer diameter of an inner ring 17. A center ring 14 must have an outer diameter larger than the inner diameter of the inner ring 17 and the inner diameter of the outer ring 16.

The base plate 10 may have a plurality of holes 22 formed around an outer diameter thereof. The holes 22 may be used to allow for installation to the constant velocity joint 110 by using one or more mechanical fasteners 20. It should be noted that other devices may be used to secure the base plate 10 to the constant velocity joint 110 without departing from the spirit and scope of the present invention. The articulating grease shield 168 may be attached in other ways that may consist of being an integral part of the boot coven 52 or the boot flange 160 but are not limited to these examples.

The spacer 12 is a flat ring that may have an outside diameter approximately the same as the base plate 10 but is not limited to this dimension depending on different CV application. The inside diameter of the spacer 12 may be as such to allow the free rotation of the inner ring 17, center ring 14, outer ring 16 within this diameter allowing for full articulation of the axle 138 within this diameter with no gaps in the inner ring 17, center ring 14, and outer ring 16.

The spacer 12 may have a plurality of holes 22A formed around an outer diameter thereof. The holes 22A may be used to allow for installation to the constant velocity joint 110 by using one or more mechanical fasteners 20. In general, the holes 22A may be aligned with the holes 22 of the base plate 10. It should be noted that other devices may be used to secure the base plate 10 and spacer 12 to the constant velocity joint 110 without departing from the spirit and scope of the present invention. The articulating grease shield 168 may be attached in other ways that may consist of being an integral part of the boot cover 152 or the boot flange 160 but are not limited to these examples.

The thickness of the spacer 12 may be determined by adding the thickness of the inner ring 17, center ring 14, and outer ring 16 and combining it with allowances for clearance tolerances that will allow for free rotation of the inner ring 17, the center ring 14 and the outer ring 16 stacked upon each other within the spacer 12. Thickness of the spacer 12 is only limited by the material used. Zero clearance may be acceptable if the material being used allows for these tolerances. In accordance with one embodiment, the inner ring 17, center ring 14 and the outer ring 16 consist of a flat ring with center openings for the axle 138. The inner diameter of the inner ring 17, center ring 14 and outer ring 16 are determined by the articulation that is required and the size of the axle 138 as to create continuous barrier that grease cannot pass through at any articulated angle within the specifications of the vehicle.

The inner ring 17 will overlap the center ring 14 and the outer ring 16 will overlap the center ring 14 with no gaps throughout the axle 138 articulation. The center diameter of the inner ring 17 will be smaller than the outer diameter of the center ring 14. The center diameter of the outer ring 16 will be smaller than the outer diameter of the center ring 14. The center ring 14 will have a center diameter of that of the axle 138 allowing for the axle 138 to move horizontally within the constant velocity joint 110. The center ring 14 may be fitted with a rubber grommet 24 or rubber boot 170 that is inserted in the center diameter depending on the axle 138 shape and size, articulation needs or specific constant velocity joint requirements but is not required.

A rim 28 may be formed on one or more of the inner ring 17, the center ring 14 and the outer ring 16. The rim 28 may formed on an outer perimeter of one or more of the respective ring members 14, 16 and or 17. The rim 28 may function as a sealing mechanism for the articulating grease shield 168. In operation, the rim 28 on a respective ring member 14, 16 and or 17 may prevent the lubricant 154 within the constant velocity joint chamber 142. Thus, the rim 28 keeps the lubricant 154 between respective ring members 14, 16 and or 17.

The cover plate 18 consist of a flat ring in which the outer diameter of the cover plate 18 may be approximately the same as the outer diameter of the base plate 10 but is not limited to this dimension. The inner diameter of the cover plate 18 may be smaller than the outer diameter of the outer ring 16 but will still allow for full articulation of the axle 138, with a solid barrier between the constant velocity joint 110 and boot 152. The cover plate 18 may have holes 22B for the insertion of mechanical fasteners 20 but is not limited to mechanical fasteners 20. The articulating grease shield 168 may be attached in other ways that may consist of being an intricate part of the boot 152 or boot flange 160 but are not limited to these examples.

The articulating grease shield 168 allows the grease to be retained in the constant velocity joint 110 with high articulation angles. The articulating grease shield 168 consists of a series of rings that overlap one another in an outer case that allows them to rotate with the axle and articulate at high angles. The number of rings and the size and location will be determined only by the articulation angel that is desired. The articulating grease shield 168 can be affixed to an existing constant velocity joint or it can become an integral part of the boot, boot flange or constant velocity joint.

Figure 3:
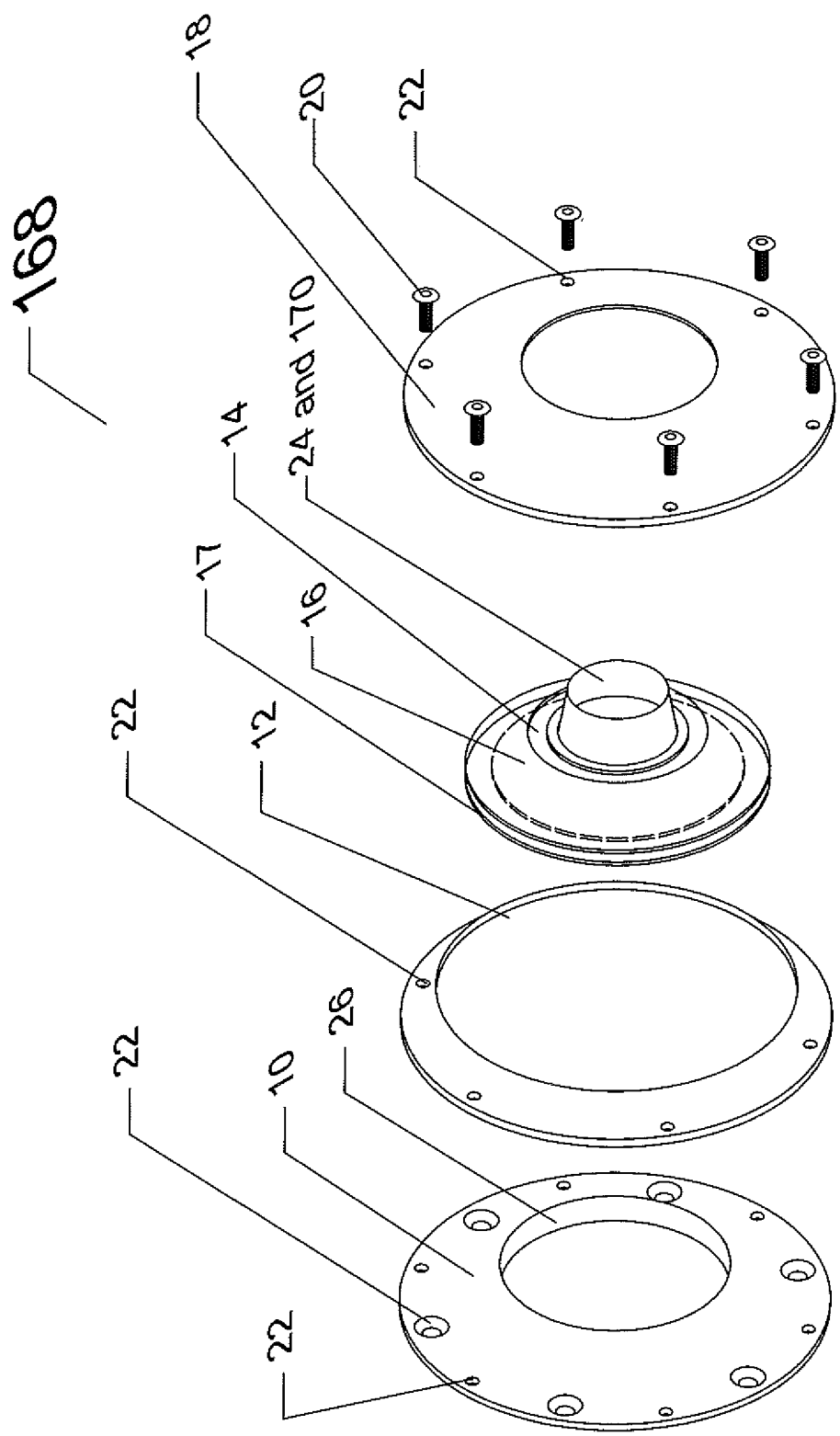
FIG. 3 is an exploded view of another embodiment the articulating grease shield.

Referring to FIG. 3, the articulating grease shield 168 is shown. The articulating grease shield 168 is the same as that shown in FIG. 2. However, in FIG. 3, the base plate 10, the spacer 12, the inner ring 17, the center ring 14 and the outer ring 16 are dome in shape.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An articulating grease shield comprising:
a plurality of ring members, wherein each ring member has a central opening through which an axle is positioned through, the central opening allowing for each of the ring members to move freely with articulation of the axle and to form a barrier to keep a lubricant within a constant velocity joint; and
a spacer having a thickness corresponding to a combined thickness of the plurality of ring members and clearance tolerances that allow for rotation of the plurality of ring members within the spacer.

2. The articulating grease shield of claim 1, wherein the plurality of ring members overlap each other.

3. The articulating grease shield of claim 1, wherein the plurality of ring members overlap each other to create a continuous barrier so that the lubricant cannot pass through at different articulated angles.

4. The articulating grease shield of claim 1, further comprising:
a base plate;
a cover positioned over the base plate;
wherein the plurality of ring members rotate within the base plate and cover.

5. The articulating grease shield of claim 4, wherein the spacer is positioned between the base plate and cover.

6. The articulating grease shield of claim 1, wherein the plurality of ring members comprises:
an inner ring;
a center ring having a rubber boot formed around an inner diameter; and
an outer ring.

7. The articulating grease shield of claim 6, wherein the inner ring overlaps the center ring, the outer ring will overlap the center ring with no gaps throughout the axle articulation.

8. The articulating grease shield of claim 6, wherein a center diameter of the inner ring is smaller than an outer diameter of the center ring, an inner diameter of the outer ring is smaller than the outer diameter of the center ring, the inner diameter of the center ring allowing for the axle to move horizontally within the constant velocity joint.

9. An articulating grease shield comprising:
a base plate;
a cover positioned over the base plate;
a spacer positioned between the base plate and cover; and
a plurality of ring members, wherein each ring member has a central opening through which an axle is positioned through, the central opening allowing for each of the ring members to move freely with articulation of the axle and to form a barrier to keep a lubricant within a constant velocity joint;
wherein the spacer has a thickness corresponding to a combined thickness of the plurality of ring members and clearance tolerances that allow for rotation of the plurality of ring members within the spacer.

10. The articulating grease shield of claim 9, wherein the plurality of ring members overlap each another.

11. The articulating grease shield of claim 9, wherein the plurality of ring members overlap each other to create a continuous barrier so that the lubricant cannot pass through at different articulated angles.

12. The articulating grease shield of claim 9, wherein the plurality of ring members comprises:
an inner ring;
a center ring having a rubber boot formed around an inner diameter; and
an outer ring.

13. The articulating grease shield of claim 12, wherein the inner ring overlaps the center ring, the outer ring will overlap the center ring with no gaps throughout the axle articulation.

14. The articulating grease shield of claim 12, wherein a center diameter of the inner ring is smaller than an outer diameter of the center ring, an inner diameter of the outer ring is smaller than the outer diameter of the center ring, the inner diameter of the center ring allowing for the axle to move horizontally within the constant velocity joint.

* * * * *